Patented Oct. 4, 1949

2,483,514

UNITED STATES PATENT OFFICE 2,483,514

PRODUCTION OF BASIC LINEAR POLYAMIDES

Sidney James Allen, London, James Gordon Napier Drewitt, Spondon, near Derby, and Frank Bryans, Ilford, England, assignors to Celanese Corporation of America, a corporation of Delaware No Drawing. Application August 26, 1947, Serial No. 770,770. In Great Britain September 2, 1946

6 Claims. (Cl. 260—78)

This invention relates to the production of synthetic materials, and more particularly of polyamides suitable for the production of filaments, films and like articles, coating compositions, and the like, and includes such articles, compositions and the like.

There have recently been a number of proposals for the production of polyamides suitable, for example, for the preparation of artificial filaments, bristles, films, foils, moulded articles and the like, as, for example, by the condensation of substantially equimolecular proportions of diprimary diamines and dicarboxylic acids or amide-forming derivatives thereof. These processes have involved the application of heat to the reagent for a substantial period in order to effect the desired condensation to an extent sufficient to produce the polymers.

Reproducibility of results in such reactions depends critically upon the strict control of temperature, and this is rendered difficult by the low thermal conductivity of the materials, and by the high viscosity of the reaction mixture which develops at a relatively early stage in the reaction. Even when the reaction is carried out in a solvent medium, the high viscosity of the mixture shortly after the reaction commences seriously impedes efficient heat distribution through the mixture.

We have now found that fibre-forming and other polyamides may be produced in a particularly efficient manner by the reaction of an ester of oxalic acid with a polyamino compound contaning two primary amino groups and one or more secondary amino groups, said primary amino groups being separated from each other by a chain of at least 3 atoms, without the application of heat. Thus, for example, by mixing at 25° C. substantially equimolecular proportions of ethyl oxalate and 1.16-diamino-7.10-diazahexadecane, $NH_2.(CH_2)_6.NH.(CH_2)_2.NH.(CH_2)_6.NH_2$, in absolute ethanol solution, the concentration of tetramine being about 5% by weight, there is rapidly produced, without the application of external heat, a pure white precipitate of a fibre-forming condensation polymer from the reagents. If desired, after separation from the ethanol, the polymer may be subjected to a heat treatment in an inert atmosphere, e.g. hydrogen or nitrogen, particularly at a temperature of 5-10° C. above its melting temperature, for a period of 5, 10 or 15 minutes up to about 1 or 2 hours, whereby its intrinsic viscosity may be increased and its fibre-forming characteristics developed to a greater extent, but in general such treatment is only applied to complete the removal of ethanol and to render the product homogeneous. Such further heat treatment is found to have substantially no effect upon the melting temperature of the material.

Other esters of oxalic acid than ethyl oxalate may be employed, including for example, other alkyl esters, e.g. the methyl ester, and aromatic esters, especially phenyl and cresyl oxalates. When using oxalic esters of phenols, the phenol released during reaction tends to remain in the polymer as a softener or plasticizer unless special washing or evaporative treatments are applied to remove it therefrom.

While it has been indicated that the proportions of reagents should be of the order of one molecule of tetramine to one molécule of oxalic ester, it is preferable to employ a slight excess of the ester up to, for example, a total of about 1.25 molecular proportions thereof, and especially from 1.05 to 1.15 molecular proportions. Such excess of the oxalic ester tends to improve the fibre-forming characteristics of the polymer as precipitated from the ethanol. It is thus different in effect from that of an excess of one of the reagents in the usual condensation polymerisation process carried out with di-primary diamines and di-acids of their amide-forming derivatives, where the fibre-forming characteristics fall off with increase of such excess over a very small fraction of a molecular percent. It is found that substantially the whole of the excess ester employed in the present process takes part in the reaction and contributes oxalyl residues combined in the polymer.

The ethanol which is employed as the medium for the reaction may be anhydrous or nearly so, or may contain a proportion of water up to 5, 7 or 10% or even more. The proportion of water present influences the degree of polymerisation of the precipitated polymer, and consequently its fibre-forming characteristics, and affects the preferred proportion of oxalic ester which is employed. Thus, with molecular proportions of one molecule of ethyl oxalate to one molecule of tetramine, it is preferable to employ substantially anhydrous ethanol, whereas with proportions of about 1.2–1.25 molecules of ethyl oxalate to one molecule of tetramine, it is advantageous to carry out the reaction in ethanol containing about 7 or 8% of water by weight. The proportion of water present in the medium also has an effect upon the preferred concentrations of the reagents. Thus, with proportions of 7 or 8% up to 10% of water, the concentration of tetramine in the ethanol may be about 10–20% without substantial modification of the characteristics of the polymer precipitated. On the other hand, in substantially anhydrous ethanol, it is preferable to work with tetramine concentrations of about 5% or even less, in order to produce good fibre-forming polymers. If the concentration substantially exceeds 10% in such relatively anhydrous media, there is a tendency for the precipitated polymer to exhibit rubbery characteristics which may for some purposes be advantageous, while relatively low polymers result when low concentrations are employed in aqueous media.

While the foregoing description is particularly concerned with the production of a polymer from the tetramine and an oxalic ester in ethanol solution, it is to be understood that other solvent media for the reagents may be employed, particularly such as are non-solvents for the polymer to be produced. The reaction may also be carried out in the presence of solvents admixed with diluents which have no substantial solvent action for one or both of the reagents and for the polymer, the proportion of diluents employed being such that the reagents are dissolved in the mixture, and that the polymer separates at a preselected degree of polymerisation. Again, a medium may be employed in which both reagents and the polymer are insoluble. In general, the solvents or diluents employed are organic substances, e. g. alcohols, ethers, hydrocarbons and the like or mixtures thereof, which are chemically inert to the reagents and to the polymer under the conditions employed.

Alternatively, the reaction may be carried out in the absence of both solvents and diluents, i. e. by mixing the oxalic ester with the supercooled liquid tetramine, in which case in particular it may be desirable to take special precautions to avoid an undue spontaneous rise in temperature during the reaction, as by strong cooling. The mixture in this case quickly sets to a solid mass of polymer, which may be subsequently treated as desired, for example by fusion and heat treatment for a period up to 1 or 2 hours to remove the alcohol or phenol released during the reaction and to increase the intrinsic viscosity of the material, after which it is found to possess good fibre-forming properties and to be susceptible to cold-drawing.

If desired, acid or basic substances, whether organic or inorganic, may be employed in small amounts to accelerate the reaction. For example, a fraction of a molecular percent of a weak acid, e. g. phosphoric or benzoic acid, may be included in the reaction mixture. According to the proportions of monofunctional acidic and basic substances so employed, they may serve to control the degree of polymerisation attained during the reaction and to stabilise the product at that particular degree of polymerisation. When required for fibre-forming, the degree of polymerisation should, in general, be such that the intrinsic viscosity of the polymer is at least 0.4 and preferably at least 0.5. Low intrinsic viscosities may be desired for other purposes, especially for coatings. Advantageously, conditions in the reaction mixture are so adjusted, as, for example, by modifying the proportion of solvents or diluents to the reagents, the proportion of added acidic or basic substances, or the relative proportions of tetramine and ester, that the polymer separates with the desired intrinsic viscosity. The intrinsic viscosity is measured by the value of $\log_e (\eta_r/c)$, where $\eta_r$ is the relative viscosity of $c$ grams of polymer in 100 ccs. m-cresol, $c$ being of the order of 1 gram.

With a view to improving the water-resistance of the polymer and to increasing their melting point, they may be treated with such reagents as, for example, carbon bisulphide, ethyl oxalate or ethyl carbonate, if desired at elevated temperature. After treatment by this means, the polymers may become insoluble and infusible, and acquire substantially reduced hydrophile characteristics. Alternatively, the solid polymer may be treated with an organic di- or poly-isocyanate or -isothiocyanate with analogous results. Such treatments are of particular importance when applied to filamentary and like products.

While the foregoing description refers particularly to the reaction of 1.16-diamino-7.10-diazahexadecane with an ester of oxalic acid, other polyamino compounds containing two primary and one or more secondary amino groups may be employed according to the invention. The primary amino groups should be so disposed as to permit of linear polymer formation with oxalic acid residues, i. e. they should be separated from each other by a chain of at least 3 atoms, and preferably at least 4 atoms. Preferably the secondary amino groups are so disposed in pairs as to form ethylene oxamide rings with oxalic acid residues. Suitable polyamino compounds are, for example, triethylene tetramine, 1.13-diamino-7-azatridecane and 1.10-diamino-4.7-diazadecane. Besides polyamines in which the two primary amino groups are linked by chains composed of nitrogen atoms and the carbon atoms of methylene groups, the invention may be carried into effect with polyamines containing other hetero-atoms in the chain linking the two primary amino groups; for example, oxygen or sulphur atoms may be present in the chain. The polyamino compounds are not restricted to the aliphatic classes, but may be alicyclic or aromatic compounds, for example, 4.4'-bis-ω-amino-methyl-diphenylamine. Again, they may have side-chain substitution in the chains linking the two primary groups, e. g. alkyl substitution or substitution as in sulphone groups or by hydroxy groups. The nitrogen atoms, other than those of the primary amino groups, may be present in such side chains as well as or instead of in the main chain. U. S. Applications S. Nos. 514,278, filed December 14, 1943, 583,841, filed March 20, 1945, 591,408, filed May 1, 1945, and 606,270, filed July 20, 1945, and U. S. Applications S. Nos. 663,626 and 663,627 both filed April 19, 1946, specify polyamines which may be employed according to the present invention and describe methods for their production. Applications Ser. Nos. 583,841, 591,408 and 663,627 are now abandoned.

It is to be understood that more than one polyamino compound may be employed in the reaction mixture, so that for example polymers may be produced from a mixture of 1.16-diamino-7.10-diazahexadecane and triethylene tetramine with a molecular proportion of oxalic ester substantially equal to the total of the molecular proportion of the polyamines. Such co-polymers possess properties, e. g. melting point and solubility, which generally differ from those of polyamides from the ester and either polyamine alone. Again, the polyamino compounds may be employed in admixture with diamines to produce other types of co-polymers.

We have further found that the intrinsic viscosity of polymers formed from the polyamines and oxalic esters may be increased by adding to the polymer a small proportion of an oxalic ester, e. g. a proportion of ethyl oxalate up to 1.5, 2.5 or 3% or more by weight of the polymer. Such after-treatment with the ester may be applied to the polymer in molten form and in solution, e. g. in m-cresol, but the results in the latter case are generally less favourable. Treatments of this nature with additional quantities of oxalic ester are applicable to polymers produced either with or without the application of heat. The intrinsic viscosity of material of relatively low molecular weight from the mother liquor of the polymer-formation in solution may be increased by treatment, while still in ethanol or other solution, with a further quantity of oxalic ester, when further polymer is precipitated, the characteristics of which approximate to those of the initial precipitate, and which may, if desired, be subjected to heat treatment. Alternatively such low molecular weight material may be separated from solution, fused and treated with further oxalic ester.

The polymers produced according to the invention may serve for the production of filaments, films and other articles. Generally, the most suitable method for producing filaments, bristles and the like is by melt-spinning, i. e. by extruding a melt of the polymer through suitable orifices. In general, the temperature of the polymer to be extruded should be from 10 to 30° C. above the melting temperature of the polymer. This melting temperature may be modified to some extent, e. g. with a view to reducing any tendency to decomposition during spinning at very high temperatures, by mixing the polymer with suitable proportions of plasticisers, for example, sulphonamide plasticisers, phenolic plasticisers, urea and thiourea plasticisers and the like. Such plasticisers may either be left in the products or may be partially or completely extracted therefrom. Filaments may also be produced by wet or dry spinning methods from solutions in suitable solvents, for example formic acid or acetic acid or phenolic solvents such as phenol and cresol.

The filaments so formed may, if the polymer be of suitable molecular weight, be drawn out at comparatively low temperatures, or even at atmospheric temperature, to very fine filaments having high tenacity and good elasticity. The resulting filaments may then be used, whether or not after-treated as described above to modify their water-resistance, strength, and other characteristics, for any of the purposes to which artificial silks have in the past been applied. Generally, the products have an affinity for the dispersed insoluble type of dyestuff now generally applied to cellulose acetate, and also exhibit a good affinity for acid wool dyestuffs.

The following examples illustrate the invention:

*Example 1*

To 449 parts by weight of 1.16-diamino-7.10-diazahexadecane dissolved in 8000 parts by weight of absolute ethanol was added 254 parts by weight of ethyl oxalate dissolved in 800 parts by weight of absolute ethanol, and after thorough mixing the whole was allowed to stand without application of external heat for 24 hours, during which time a pure white precipitate formed. The precipitated material was filtered off, washed with 240 parts by weight of absolute ethanol and dried at 60° C./20 mm. Hg, and then amounted to 456 parts by weight. This product melted at 150–160° C., had an intrinsic viscosity of about 0.65, and gave the following analytical figures: C 60.28%, H 10.18%, N 17.4% (Theory for

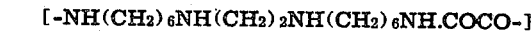

[$-NH(CH_2)_6NH(CH_2)_2NH(CH_2)_6NH.COCO-$]

C 61.50%, H 10.32%, N 17.93%). It readily formed fibres from the melt at about 170° C., and the fibres could be cold-drawn. The product was somewhat soluble in m-cresol, formic acid, formamide and concentrated aqueous solutions of lithium bromide, calcium chloride, zinc chloride and similar inorganic salts.

The precipitated product, after washing and drying, was heated at 165° C. for 2 hours to free it from last traces of ethanol and to homogenise it, and then retained substantially identical intrinsic viscosity, solubility and fibre-forming properties, but showed a rather sharper melting point of about 160° C. Analysis gave C 60.93%, H 10.20%, N 17.9%.

Half of the mother liquor from which the polymer had separated was evaporated to constant weight and left a soft, waxy material of relatively low intrinsic viscosity and melting at about 120–125° C., without fibre-forming properties.

The remaining half of the mother liquor was treated with 13.1 parts by weight of ethyl oxalate and allowed to stand at room temperature for 4 days. A precipitate formed and was found to have good fibre-forming properties and an intrinsic viscosity of about 0.55.

*Example 2*

To 296 parts by weight of 1.16-diamino-7.10-diazahexadecane dissolved in 2200 parts by weight of 96% aqueous ethanol was added 180 parts by weight of ethyl oxalate. The clear mixture soon changed to a white pasty mass and, after 24 hours during which time the mass was stirred, the liquors were filtered off, and the residue washed with absolute ethanol and dried under vacuum. The residual polymer melted at 150–160° C., had an intrinsic viscosity of about 0.55 and showed good fibre-forming properties.

*Example 3*

50 parts by weight of a polymer of intrinsic viscosity about 0.45, prepared by reaction of 1 molecular proportion of 1.16-diamino-7.10-diazahexadecane with 1.065 molecular proportion of ethyl oxalate without application of external heat, was dissolved in 4 times its weight of hot m-cresol and the solution heated with 1.25 parts by weight of ethyl oxalate at 165° C. for 5 hours in an atmoshere of hydrogen. The solution was then poured into a large volume of acetone, the precipitated polymer filtered off, washed with acetone and dried. It was found to possess good fibre-forming properties, with M. P. 155° C. and intrinsic viscosity about 0.56.

Having described our invention, what we desire to secure by Letters Patent is:

1. Process for the production of linear polyamides, which comprises reacting between 1.05 and 1.25 moles of an ester of oxalic acid selected from the group consisting of methyl and ethyl esters with 1 mole of tetramine containing as its sole reactive groups two primary amino groups and a pair of secondary amino groups linked by the radical —$CH_2$—$CH_2$—, the process being carried out without external heat and in a medium which is a solvent for the monomers and a non-solvent for the polymer.

2. Process for the production of linear polyamides, which comprises reacting between 1.05 and 1.25 moles of an ester of oxalic acid selected from the group consisting of methyl and ethyl esters with 1 mole of 1.16-diamino-7.10-diazahexadecane, the process being carried out without external heat and in a medium which is a solvent for the monomers and a non-solvent for the polymer.

3. Process for the production of linear polyamides, which comprises reacting between 1.05 and 1.25 moles of an ester of oxalic acid selected from the group consisting of methyl and ethyl esters with 1 mole of tetramine containing as its sole reactive groups two primary amino groups and a pair of secondary amino groups linked by the radical —$CH_2$—$CH_2$—, the reaction being carried out without external heat and in a medium consisting substantially of ethanol.

4. Process for the production of linear polyamides, which comprises reacting between 1.05 and 1.25 moles of an ester of oxalic acid selected from the group consisting of methyl and ethyl esters with 1 mole of 1.16-diamino-7.10-diazahexadecane, the reaction being carried out without external heat and in a medium consisting substantially of ethanol.

5. Process for the production of polyamides, which comprises reacting between 1.05 and 1.25 moles of an ester of oxalic acid selected from the group consisting of methyl and ethyl esters with 1 mole of a tetramine containing as its sole reactive groups two primary amino groups and a pair of secondary amino groups linked by the radical —$CH_2$—$CH_2$—, the reaction being carried out without the application of heat and in solution in anhydrous ethanol in a proportion to give a polyamine concentration at the most about 5%.

6. Process for the production of polyamides, which comprises reacting between 1.05 and 1.25 moles of an ester of oxalic acid selected from the group consisting of methyl and ethyl esters with 1 mole of a tetramine containing as its sole reactive groups two primary amino groups and a pair of secondary amino groups linked by the radical —$CH_2$—$CH_2$—, the reaction being carried out without the application of heat and in solution in aqueous ethanol containing up to 10% of water and in quantity to give a polyamine concentration of 10–20%.

SIDNEY JAMES ALLEN.
JAMES GORDON NAPIER DREWITT.
FRANK BRYANS.

REFERENCES CITED

The following references are of record in the file of this patent:

UNITED STATES PATENTS

| Number | Name | Date |
|---|---|---|
| 2,130,523 | Carothers | Sept. 20, 1938 |
| 2,149,273 | Carothers | Mar. 7, 1939 |
| 2,325,567 | Bock et al. | July 27, 1943 |

FOREIGN PATENTS

| Number | Country | Date |
|---|---|---|
| 882,841 | France | Mar. 8, 1943 |